(12) United States Patent
Spector et al.

(10) Patent No.: US 9,154,302 B2
(45) Date of Patent: Oct. 6, 2015

(54) SYSTEM AND METHOD FOR SECURE TWO-FACTOR AUTHENTICATED ID-BASED KEY EXCHANGE AND REMOTE LOGIN USING AN INSECURE TOKEN AND SIMPLE SECOND-FACTOR SUCH AS A PIN NUMBER

(71) Applicant: CertiVox, Ltd., London (GB)

(72) Inventors: Brian P. Spector, Seattle, WA (US); Michael Scott, Dublin (IE)

(73) Assignee: CERTIVOX LTD., London (GB)

( * ) Notice: Subject to any disclaimer, the term of this patent is extended or adjusted under 35 U.S.C. 154(b) by 308 days.

(21) Appl. No.: 13/749,408

(22) Filed: Jan. 24, 2013

(65) Prior Publication Data

US 2013/0191638 A1    Jul. 25, 2013

Related U.S. Application Data

(60) Provisional application No. 61/590,699, filed on Jan. 25, 2012.

(51) Int. Cl.
| | |
|---|---|
| *H04L 9/32* | (2006.01) |
| *H04L 9/08* | (2006.01) |
| *H04L 9/30* | (2006.01) |
| *G06F 21/44* | (2013.01) |

(52) U.S. Cl.
CPC ............ *H04L 9/32* (2013.01); *H04L 9/0844* (2013.01); *H04L 9/3073* (2013.01); *H04L 9/321* (2013.01); *H04L 9/3226* (2013.01); *H04L 9/3234* (2013.01); *G06F 21/445* (2013.01); *G06F 2207/7204* (2013.01)

(58) Field of Classification Search
CPC ............... H04L 9/3073; G06F 21/445; G06F 2207/7204

USPC ........................................................ 713/168
See application file for complete search history.

(56) References Cited

U.S. PATENT DOCUMENTS

| | | | |
|---|---|---|---|
| 7,239,701 B1 | 7/2007 | Ogishi et al. | |
| 7,590,236 B1 | 9/2009 | Boneh et al. | |
| 7,860,247 B2 | 12/2010 | McCullagh et al. | |
| 8,285,996 B2 | 10/2012 | McCullagh et al. | |
| 2003/0081785 A1 | 5/2003 | Boneh et al. | |
| 2005/0262353 A1* | 11/2005 | Gentry et al. | ............... 713/176 |
| 2006/0050886 A1 | 3/2006 | Tuyls et al. | |
| 2007/0165843 A1 | 7/2007 | Lauter et al. | |
| 2009/0285386 A1* | 11/2009 | Takashima | ..................... 380/28 |
| 2010/0235627 A1* | 9/2010 | Kerschbaum et al. | ........ 713/156 |
| 2013/0179679 A1* | 7/2013 | Broustis et al. | ............... 713/152 |

(Continued)

OTHER PUBLICATIONS

Efficient Algorithms for Pairing-Based Cryptosystems; Paulo S. M. Barreto et al.; 2002; ePrint.iacr.org/2002/008.pdf.*

(Continued)

*Primary Examiner* — James Turchen
(74) *Attorney, Agent, or Firm* — Saul Ewing LLP

(57) ABSTRACT

A system and method of authenticated ID-based key exchange and remote login with insecure token and PIN number can provide an authenticated key agreement protocol based on an elliptic curve bilinear type-3 pairing. A server acts as an Authentication Service to Clients and a Trusted Authority (TA) issues identity based secret numbers to Clients and Authentication Services. Included in the system and method is the capability for the Client to split their secret number into two parts, a Client selected PIN number, and the larger number, the Token.

1 Claim, 7 Drawing Sheets

(56) References Cited

U.S. PATENT DOCUMENTS

2013/0191638 A1 7/2013 Spector et al.
2014/0105384 A1* 4/2014 Brier .............................. 380/30

OTHER PUBLICATIONS

Authenticated ID-based Key Exchange and remote log-in with simple token and PIN number; 2002; Michael Scott; eprint.iacr.org/2002/164.pdf.*
IBAKE: Identity-Based Authenticated Key Exchange Protocol; Vladimir Kolesnikov et al.; 2011.*
A New Two-Party Identity-Based Authenticated Key Agreement; Noel McCullagh et al.; LNCS 3376, 2005, pp. 262-274.*
International Searching Authority, International Search Report and Written Opinion for International Patent Application No. PCT/US2013/023255, Apr. 12, 2013, 7 pages.
IEEE P1363 home page. http://grouper.ieee.org/groups/1363/, Oct. 10, 2008.
P.S.L.M. Barreto and M. Naehrig. Pairing-friendly elliptic curves of prime order. In Selected Areas in Cryptology—SAC 2005, vol. 3897 of Lecture Notes in Computer Science, pp. 319-331. Springer-Verlag, 2006.
S. Blake-Wilson, D. Johnson, and A. Menezes. Key agreement protocols and their security analysis. Cryptography and Coding, 1355:30-45, 1997.
D. Boneh and M. Franklin. Identity-based encryption from the Weil pairing. SIAM Journal of Computing, 32(3):586-615, 2003.
L. Chen and C. Kudla. Identity based key agreement protocols from pairings. In Proc. of the 16-th IEEE Computer Security Foundations Workshop, pp. 219-233. IEEE Computer Society, 2003.
D. Fiore and R. Gennaro. Making the Diffie-Hellman protocol identity-based. In Topics in Cryptology—CT-RSA 2010, vol. 5985 of Lecture Notes in Computer Science, pp. 165-178. Springer, 2010.
D. Freeman, M. Scott, and E. Teske. A taxonomy of pairing friendly elliptic curves. Journal of Cryptography, 23:224-280, 2010.
L. Fuentes-Castaneda, E. Knapp, and R. Rodriguez-Henriquez. Faster hashing to $G\_2$. In Selected Areas in Cryptography—SAC 2011, vol. 7118 of Lecture Notes in Computer Science, pp. 412-430. Springer-Verlag, 2011.
S. Galbraith, K. Paterson, and N. Smart. Pairings for cryptographers. Discrete Applied Mathematics, 156:3113-3121, 2008.
S. Galbraith and M. Scott. Exponentiation in pairing-friendly groups using homomorphisms. In Pairing 2008, vol. 5209 of Lecture Notes in Computer Science, pp. 211-224. Springer-Verlag, 2008.
R.P. Gallant, R.J. Lambert, and S.A. Vanstone. Faster point multiplication on elliptic curves with efficient endomorphisms. In Advances in Cryptology—Crypto 2001, vol. 2139 of Lecture Notes in Computer Science, pp. 190-200. Springer-Verlag, 2001.
F. Hao and D. Clarke. Security analysis of a multi-factor authenticated key exchange protocol. Cryptology ePrint Archive, Report 2012/039, 2012. http://eprint.iacr.org/2012/039.
H. S. Kim, S. W. Lee, and K. Y. Yoo. ID-based password authentication scheme using smart cards and fingerprints. ACM Operating Systems Review, 37(4):32-41, 2003.
I. Liao, C. Lee, and M. Hwang. A password authentication scheme over insecure networks. Journal of Computer and System Sciences, 72:727-740, 2006.
R. Martinez-Pelaez and F. Rico-Novella. Cryptanalysis of Sood at al.'s authentication scheme using smart cards. Cryptology ePrint Archive, Report 2012/386, 2012. http://eprint.iacr.org/2012/386.
D. Pointcheval and S. Zimmer. Multi-factor authenticated key exchange. In ACNS'08 Proceedings of the 6th international conference on Applied cryptography and network security, pp. 277-295. Springer-Verlag, 2008.
R. Sakai, K. Ohgishi, and M. Kasahara. Cryptosystems based on pairing. The 2000 Symposium on Cryptography and Information Security, Okinawa, Japan, 2000.
C. P. Schnorr. Efficient identification and signatures for smart cards. In Crypto'89: Advances in Cryptology, vol. 435 of Lecture Notes in Computer Science, pp. 239-252, 1989.
M. Scott. Authenticated ID-based key exchange and remote log-in with simple token and PIN number. Cryptology ePrint Archive, Report 2002/164, 2002. http://eprint.iacr.org/2002/164.
M. Scott. Cryptanalysis of an ID-based password authentication scheme using smart cards and fingerprints. Cryptology ePrint Archive, Report 2004/017, 2004. http://eprint.iacr.org/2004/017.
M. Scott. On the efficient implementation of pairing-based protocols. In Cryptography and Coding 2011, vol. 7089 of Lecture Notes in Computer Science, pp. 296-308. Springer-Verlag, 2011.
A. Shamir. Identity-based cryptosystems and signature schemes. In Advances in Cryptology: Proceedings of CRYPTO 84, vol. 196 of Lecture Notes in Computer Science, pp. 47-53, 1984.
S. Sood, A. Sarje, and K. Singh. An improvement of Liao at al's authentication scheme using smart cards. International Journal of Computer Applications, 1(8):16-23, 2010.
D. Stebila, P. Poornaprajna, and S. Chang. Multi-factor password-authenticated key exchange. In Australasian Information Security Conference, CPRIT vol. 105, pp. 56-66. Australian Computer Society, 2010.
C. Tsai, C. Lee, and M. Hwang. Password authentication schemes: Current status and key issues. International Journal of Network Security, 3(2):101-115, 2006.
D. Wang, C. Ma, and P. Wu. Secure password-based remote user authentication scheme with non-tamper resistant smart cards. Cryptology ePrint Archive, Report 2012/227, 2012. http://eprint.iacr.org/2012/227.
Shengbao Wang, Zhenfu Cao, Zhaohui Cheng, and Kim-Kwang Raymond Choo. Perfect forward secure identity-based authenticated key agreement protocol in the escrow mode. Science in China Series F Information Sciences, 52(8): 1358-1370, 2009.
Y. Wang. Efficient identity-based and authenticated key agreement protocol. Cryptology ePrint Archive, Report 2005/108, 2005. http://eprint.iacr.org/2005/108.
Y. Wang. Password protected smart card and memory stick authentication against off-line dictionary attacks. Cryptology ePrint Archive, Report 2012/120, 2012. http://eprint.iacr.org/2012/120.
T. Wu. The secure remote password protocol. In Proceedings of the 1998 Internet Society Network and Distributed System Security Symposium, pp. 97-111, 1998.
Guomin Yang, Duncan S. Wong, Huaxiong Wang, and Xiaotie Deng. Formal analysis and systematic construction of two-factor authentication scheme. In Proceedings of the 8th international conference on Information and Communications Security, ICICS'06, pp. 82-91. Springer-Verlag, 2006.
E. Yoon and K. Yoo. New authentication scheme based on a one-way hash function and Diffie-Hellman key exchange. In CANS'05 Proceedings of the 4th international conference on Cryptology and Network Security, vol. 3810 of Lecture Notes in Computer Science, pp. 147-160. Springer-Verlag, 2005.
D. F. Aranha, K. Karabina, P. Longa, C. H. Gebotys, and J. Lopez. Faster explicit formulas for computing pairings over ordinary curves. Cryptology ePrint Archive, Report 2010/526, 2010. http://eprint.iacr.org/2010/526.
L. Ballard, M. Green, B. de Medeiros, and F. Montrose. Correlation-resistant storage via keyword-searchable encryption. Cryptology ePrint Archive, Report 2005/417, 2005. http://eprint.iacr.org/2005/417.
F. Bao, R. Deng, and H. Zhu. Variations of diffie-hellman problem. In ICICS 2003, vol. 2836 of Lecture Notes in Computer Science, pp. 301-312. Springer-Verlag, 2003.
M. Bellare, C. Namprempre, and G. Neven. Security proofs for identity-based identification and signature schemes. In Eurocrypt 2004, vol. 3027 of Lecture Notes in Computer Science, pp. 268-286. Springer-Verlag, 2004.
D. Boneh, B. Lynn, and H. Shacham. Short signatures from the weil pairing. In Asiacrypt 2001, vol. 2248 of Lecture Notes in Computer Science, pp. 514-532. Springer-Verlag, 2001.
J. Cha and J. Cheon. An identity-based signature from gap diffie-hellman groups. In PKC 2003, vol. 2567 of Lecture Notes in Computer Science, pp. 18-30. Springer-Verlag, 2003.

(56) References Cited

OTHER PUBLICATIONS

B. Chevalier-Mames, J-S. Coron, N. McCullagh, D. Naccache, and M. Scott. Secure delegation of elliptic curve pairing. Cryptology ePrint Archive, Report 2005/150, 2005. http://eprint.iacr.org/2005/150.

A. Fiat and A. Shamir. How to prove yourself: Practical solutions to identification and signature problems. In Crypto 1986, vol. 263 of Lecture Notes in Computer Science, pp. 186-194. Springer-Verlag, 1987.

K. Kurosawa and S-H. Heng. From digital signature to ID-based identification/ signature. In PKC 2004, vol. 2947 of Lecture Notes in Computer Science, pp. 125-143. Springer-Verlag, 2004.

C. H. Lim and P. J. Lee. A key recovery attack on discrete log-based schemes using a prime order subgroup. In Crypto 1994, vol. 1294 of Lecture Notes in Computer Science, pp. 249-263. Springer-Verlag, 1994.

J. Pollard. Monte carlo methods for index computation mod p. Mathematics of Computation, 32, 1978.

M. Scott. Computing the tate pairing. In CT-RSA 2005, vol. 3376 of Lecture Notes in Computer Science, pp. 293-304. Springer-Verlag, 2005.

M. Scott. Replacing username/password with software-only two-factor authentication. Cryptology ePrint Archive, Report 2012/148, 2012. http://eprint.iacr.org/2012/148.

M. Scott and P. S. L. M. Barreto. Compressed pairings. Cryptology ePrint Archive, Report 2004/032, 2004. http://eprint.iacr.org/2004/032.

N. Smart and F. Vercauteren. On computable isomorphisms in efficient pairing-based systems. Discrete Applied Mathematics, 155:538-547, 2007.

M. Stam and A. K. Lenstra. Speeding up XTR. In Asiacrypt 2001, vol. 2248 of Lecture Notes in Computer Science, pp. 125-143. Springer-Verlag, 2001.

Y. Tseng and T. Tsai. Efficient revocable ID-based encryption with a public channel. The Computer Journal, 55 (4):475-486, 2012.

Y. Wang. Efficient identity-based and authenticated key agreement protocol. Cryptology ePrint Archive, Report 2005/108, 2005. http://eprint.iacr.org/2005/108.

X. Yi. An identity-based signature scheme from weil pairing. IEEE Communications Letters, 7:76-78, 2003.

R. Gallant, R. Lambert, and S. Vanstone. Faster point multiplication on elliptic curves with efficient endomorphism. In Crypto 2001, vol. 2139 of Lecture Notes in Computer Science, pp. 190-200. Springer-Verlag, 2001.

R. Sakai and M. Kasahara. ID based cryptosystems with pairing on elliptic curve. Cryptology ePrint Archive, Report 2003/054, 2003. http://eprint.iacr.org/2003/054.

Unbalancing Pairing-Based Key Exchange Protocols—Oct. 2013.

Subliminal Channel (Extract from Wikipedia)—Last modified Nov. 18, 2013 according to web page.

Client-Server Authentication Using Pairings, 2012.

Client-Server Multi-Factor Authentication Using Pairings, 2012.

Extract from the "Get M-pin" part of the Certivox website (available in Jul. 2013).

M-Pin Full Technology—Jul. 2013.

M-Pin—A Multi-Factor Zero Knowledge Authentication Protocol—Jul. 2013.

\* cited by examiner

Figure 4

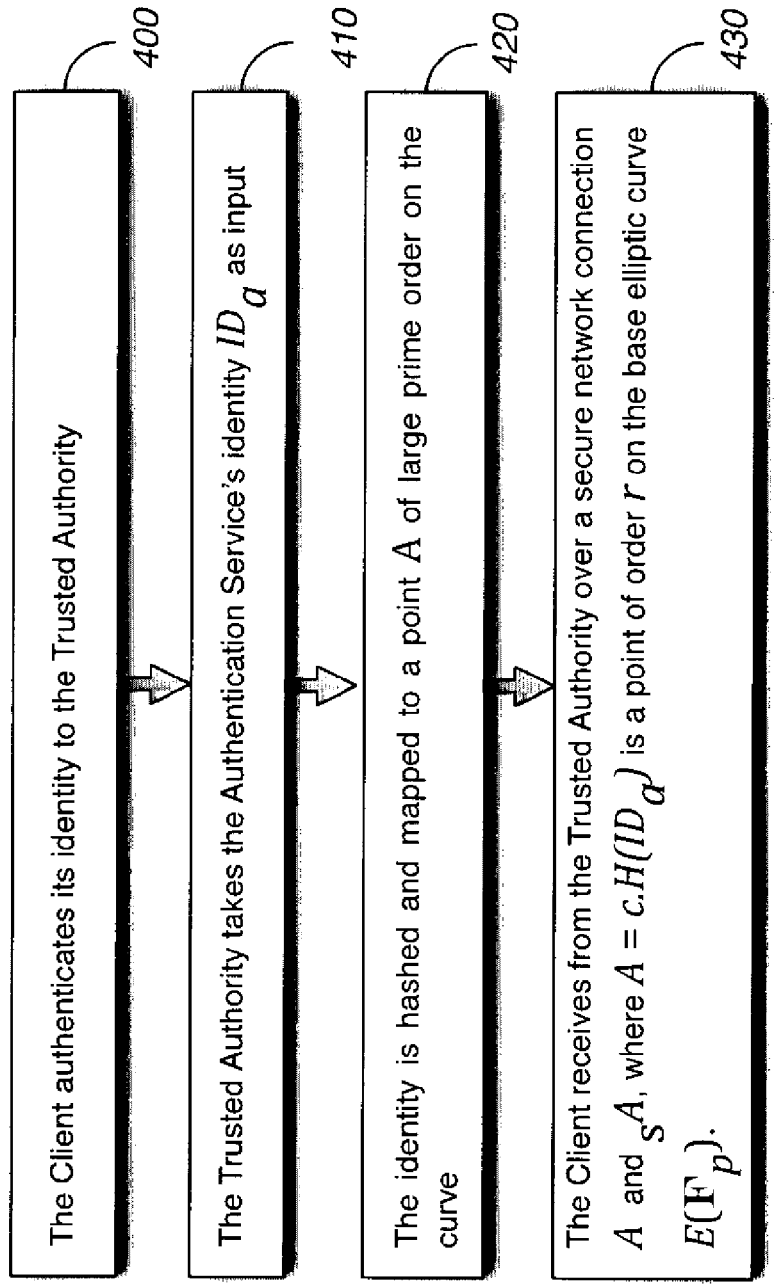

400 — The Client authenticates its identity to the Trusted Authority

410 — The Trusted Authority takes the Authentication Service's identity $ID_a$ as input 420 — The identity is hashed and mapped to a point $A$ of large prime order on the curve 430 — The Client receives from the Trusted Authority over a secure network connection $A$ and $_sA$, where $A = c.H(ID_a)$ is a point of order $r$ on the base elliptic curve $E(\mathbf{F}_p)$.

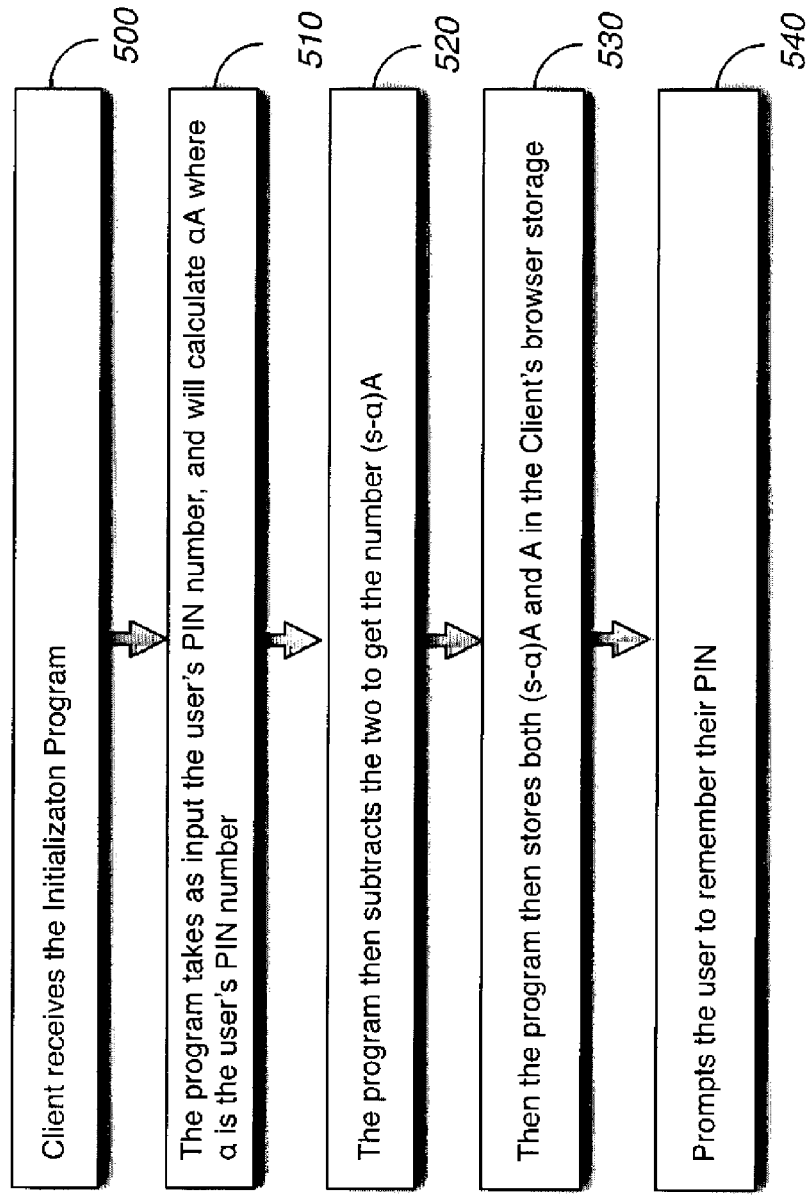

SYSTEM AND METHOD FOR SECURE TWO-FACTOR AUTHENTICATED ID-BASED KEY EXCHANGE AND REMOTE LOGIN USING AN INSECURE TOKEN AND SIMPLE SECOND-FACTOR SUCH AS A PIN NUMBER

CLAIM OF PRIORITY

This application claims the benefit of priority to U.S. Provisional Patent Application No. 61/590,699, titled "SYSTEM AND METHOD FOR SECURE TWO-FACTOR AUTHENTICATED ID-BASED KEY EXCHANGE AND REMOTE LOGIN USING AN INSECURE TOKEN AND SIMPLE SECOND-FACTOR SUCH AS A PIN NUMBER", filed Jan. 25, 2012; which application is herein incorporated by reference.

BACKGROUND

The present invention is in the field of electronic authentication and authenticated key agreement. The purpose of the invention is to provide a method of authenticated key agreement in a client to server setting that advances the concept of two-factor authentication and provides an alternative to token based schemes that are often based on expensive (and irreplaceable) smart-card tokens, and provides an alternative to password-only schemes require that username and password management in a client and server context.

SUMMARY

This method employs a Trusted Authority (TA) that issues to a Client and Authentication Service an individual Secret Number associated with their identity. While the Authentication Service stores number in whole form, each Client "splits" this number into a small user-selected PIN number, and a larger number, the Token, which can be stored anywhere, and this has the added benefit that it is not required to be secured or encrypted. The rest of the invention will refer to the simple second factor as being a simple user-selected PIN number, however, this is clearly not meant to limit the use of any form of simple easily remembered user supplied second factor which could be a simple passphrase or repeatable number biometric, etc. which could be used equally in this invention.

BRIEF DESCRIPTION OF DRAWINGS

FIG. 4 is a block diagram that illustrates the steps taken that securely distributes the Secret Number to the Client from the Trusted Authority (TA) according to an embodiment of the invention.

FIG. 5 is a block diagram that illustrates the steps taken that for the Client to initialize their Secret Number into the Token and PIN form using the Initialization Program, and stores their Token.

DETAILED DESCRIPTION OF THE PREFERRED EMBODIMENT

Figure 1:
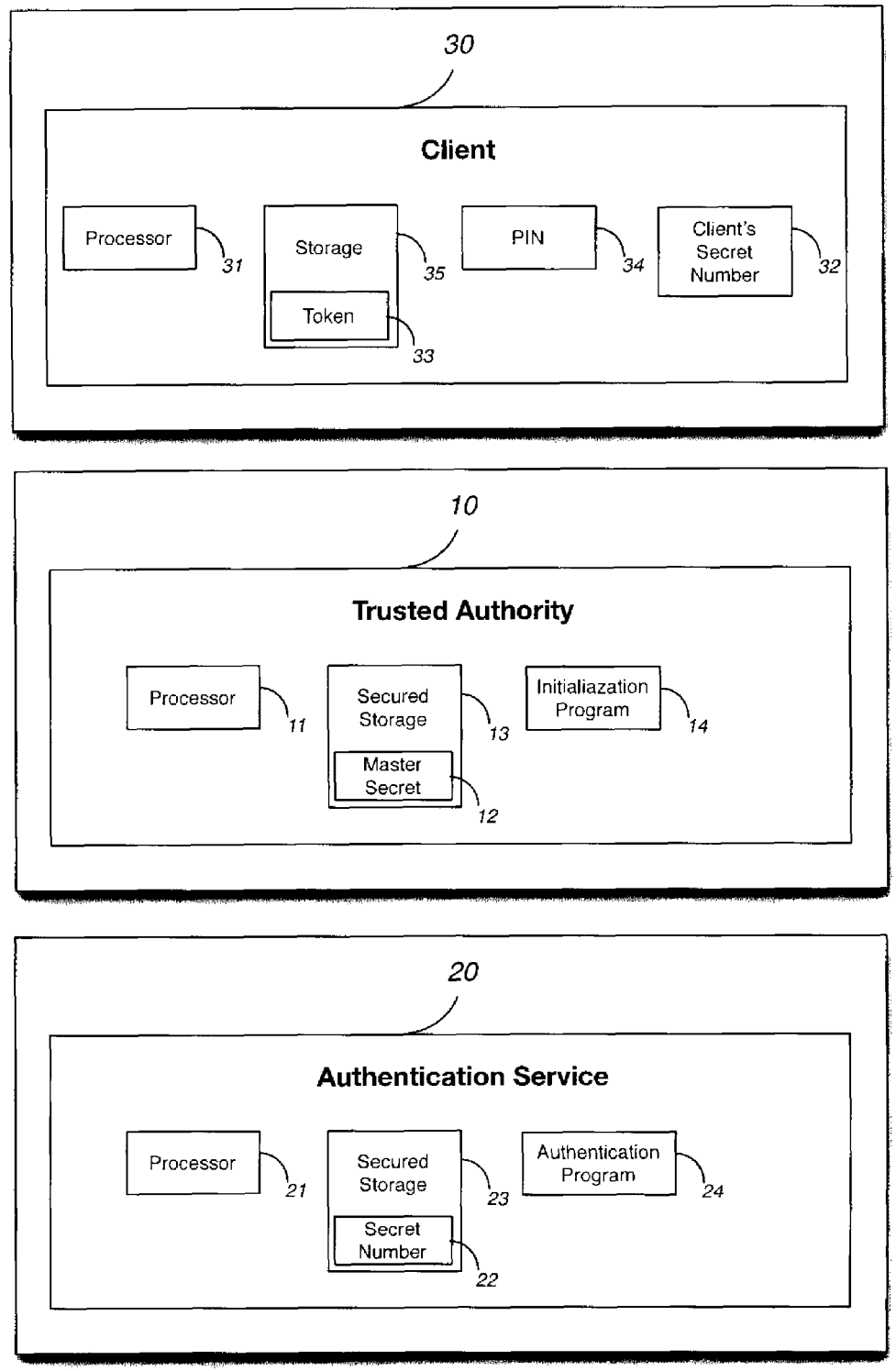
FIG. 1 is a block diagram illustrating the internal components and the external components interacting with the entire system and method in the preferred embodiment of the invention.

Our system and method has desirable security properties including the required use of a large identity-based secret number and a PIN number, as this gives in effect strong 2-factor authentication. We also leverage a separate TA with its own Master Secret that is not required on-line which provides an extra layer of security and limits the damage caused by the loss of Client or server long-term secrets. Another desirable feature is that a rogue client who steals another Client's long-term secret is not able to determine their PIN by performing off-line key-exchanges with themselves. That is, Clients should only be able to exchange keys with servers, not with other Clients.

While much prior art exists in the field of authenticated key agreement using bilinear pairings, the invention described contains a system and method that is the first suitable for an enterprise class production environment incorporating two-factor authentication, with the unique properties of leveraging insecure storage of the token, into a whole usable system.

The object of the invention is to provide a system and method of authenticated ID-based key exchange and remote login with insecure token and PIN number that, 1) Provides an authenticated key agreement protocol based on an elliptic curve bilinear type-3 pairing, whereby a server acts as an Authentication Service to Clients and a Trusted Authority (TA) issues identity based secret numbers to Clients and Authentication Services. Included in the system and method is the capability for the Client to split their secret number into two parts, a Client selected PIN number, and the larger number, the Token.

We describe an embodiment of the invention, how the Client is issued their secret number from the TA, and initializes their Token in a method where they input and confirm their PIN with a JavaScript program, which stores their Token in their browser's storage. With the Authentication Service providing a web server front end, the Client and Authentication Service are able to mutually authenticate each other, and derive a mutually agreed session key. We show our invention contains desirable security properties such that no eavesdropper is in the position to determine the PIN from transmitted values, irrespective of their computing power.

2) Addresses a security vulnerability in potentially similar authenticated key agreement systems with a PIN extraction protocol, enabling this system and method to withstand a Key Compromise Impersonation (KCI) attack, and ties the identities of the Clients and Authentication Service to the their individual secret number to prohibit identity spoofing, i.e., where one Client would authenticate themselves to an Authentication Service using another identity. We show that other systems and methods do not withstand the KCI attack in tandem with the inability to mitigate identity spoofing. Additionally, we describe other embodiments possessing the same security properties, demonstrating that there exists a wide range of protocols this system and method can be adapted to.

The approaches described in this section could be pursued but are not necessarily approaches that have been previously conceived or pursued when taken together as a whole system and method. Therefore, unless other wise indicated herein, the approaches described in this section are not prior art to the claims in this application and are not admitted to be prior art by inclusion in this section.

The main components of the invention include a Trusted Authority (TA), responsible for generating a Master Secret, an Authentication System that receives a secret number from the TA, and a Client that receives a secret number from the TA. The Client performs an additional step through the system and method whereby it allows the user of the Client system to create a desired PIN number, which during this additional step results in a Token being generated. This Token can then be stored insecurely, and the PIN, which in the preferred embodiment of the invention, is committed to memory by the User of the Client for later use.

The Trusted Authority (TA) is a computer process running on a computer or server that generates a Master Secret. The TA is responsible for initially enrolling participants on the system, and allotting identifiers to these entities, for example, using an email address for Clients, and a URL for Authentication Services. The TA uses the identifiers to map them using a suitable hash function to points on a particular elliptic curve.

The Authentication Service is a computer process running on a computer or server that receives a secret number from the Trusted Authority. It participates with the Client in the authenticated key agreement protocol to mutually verify each other's identity and generate a session key.

The Client is a computer process running on a computer or server that that receives a secret number from the Trusted Authority. For avoidance of doubt, there is a user of the Client, generally a human being. The Client participates with the Authentication Service in the authenticated key agreement protocol to mutually verify each other's identity and generate a session key.

As per the illustration in FIG. 1, the Trusted Authority (TA) (10) can be software running on a computer, or a dedicated hardware device, that contains a processor (11) with the appropriate computer code running the instructions. Additionally, the TA will create a Master Secret (12) and store the Master Secret is Secured Storage (13), ideally, in the preferred embodiment of the invention, storage that is tamper proof and tamper resistant. In the preferred embodiment of the invention, the Trusted Authority (10) sends to the Client (30) over a secure network connection its Secret Number (32) a computer program, i.e. the Initialization Program (14), which programmatically enables the Client (30), using the Secret Number (32), to construct its PIN (34) and store the its Token (33) in the Client's browser storage (35) or other insecure storage medium.

The As per the illustration in FIG. 1, the Authentication Service (20) can be software running on a computer, or a dedicated hardware device, that contains a processor (21) with the appropriate computer code capable running the instructions. The Authentication Service (20) is enrolled with the Trusted Authority (10) to obtain its own Secret Number (22). Ideally, in the preferred embodiment of the invention, the Secret Number (22) is stored in Secured Storage (23), storage that is tamper proof and tamper resistant. In the preferred embodiment of the invention, the Authentication Service (20) sends to the Client (30) over a secure network connection a computer program, i.e. the Authentication Program (24), which programmatically enables the Client (30) to reconstruct it's Secret Number (32) from the PIN (34) and Token (33) and engages in the authenticated key agreement protocol with the Authentication Service (20).

The As per the illustration in FIG. 1, the Client (30) can be software running on a computer, or a dedicated hardware device, that contains a processor (31) with the appropriate computer code running the instructions. The Client will also have access to Storage (35) for the purpose of storing its Token (33). In the described embodiments of the invention, this Storage (35) can be the Client's browser's storage, or a wholly separate USB flash drive. This storage need not be protected at all. The PIN (34) is not stored, but in the preferred embodiment of the invention, is manually input by the human operator of the Client (30) in the protocol to assemble the Client's Secret Number (32).

Figure 2:
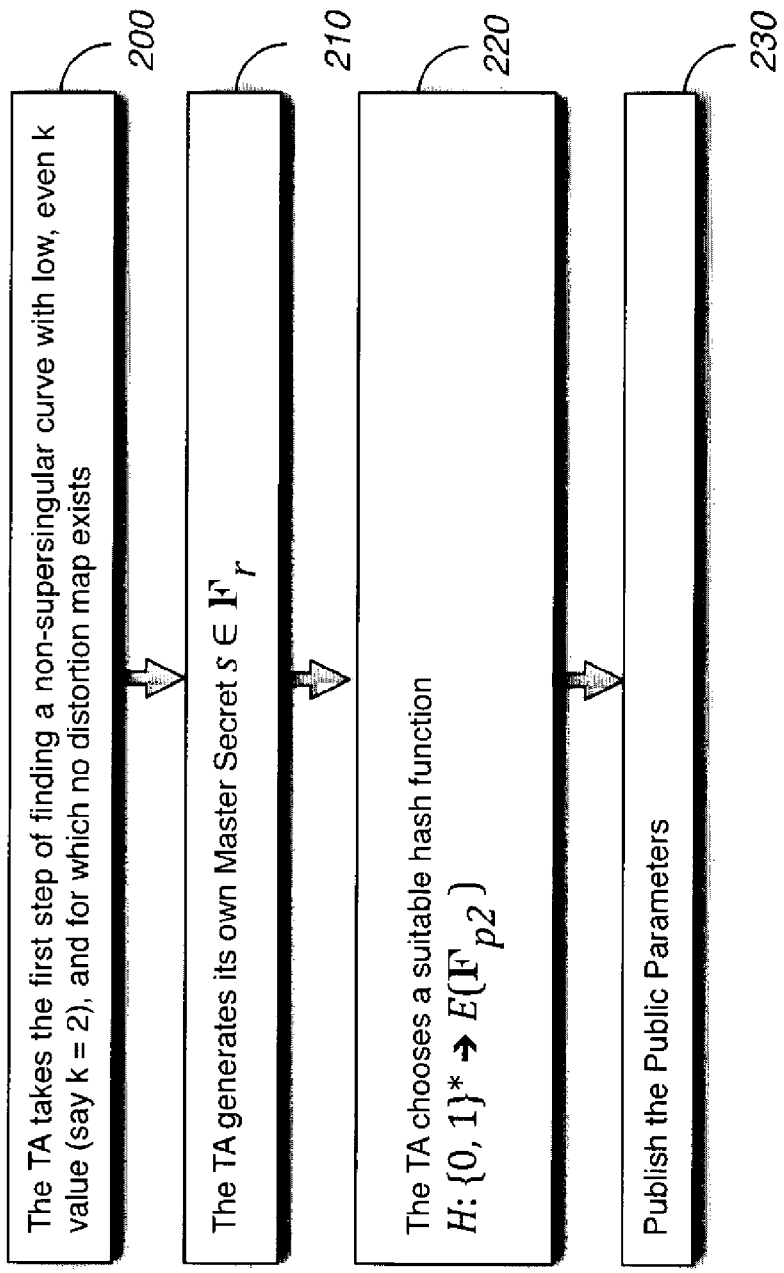
FIG. 2 is a block diagram that illustrates the steps taken that securely initializes the set-up phase of the Trusted Authority (TA) according to an embodiment of the invention.

In one embodiment of the invention, as shown in FIG. 2, the TA takes the first step of finding a non-supersingular curve with low, even k value (say k=2), and for which no distortion map exists 200. As an example, k=2 non-supersingular curve over $F_p$, where p=512 bits, such that the curve order is c.r. and is divisible by the 160-bit prime r. It now generates its own 210 Master Secret s$\epsilon F_r$. The TA chooses a 220 suitable hash function H: $\{0, 1\}*E(F_{p2})$, which hashes identity strings it will receive during the Authentication Service and Client enrolment process (the IDs of the Authentication Service and Client) to a point on the supersingular curve. Finally, it publishes 230 the public parameters $\{p,r,H\}$ to a readily accessible location that both Clients and Authentication Services can access, such as a public facing web site.

Figure 3:
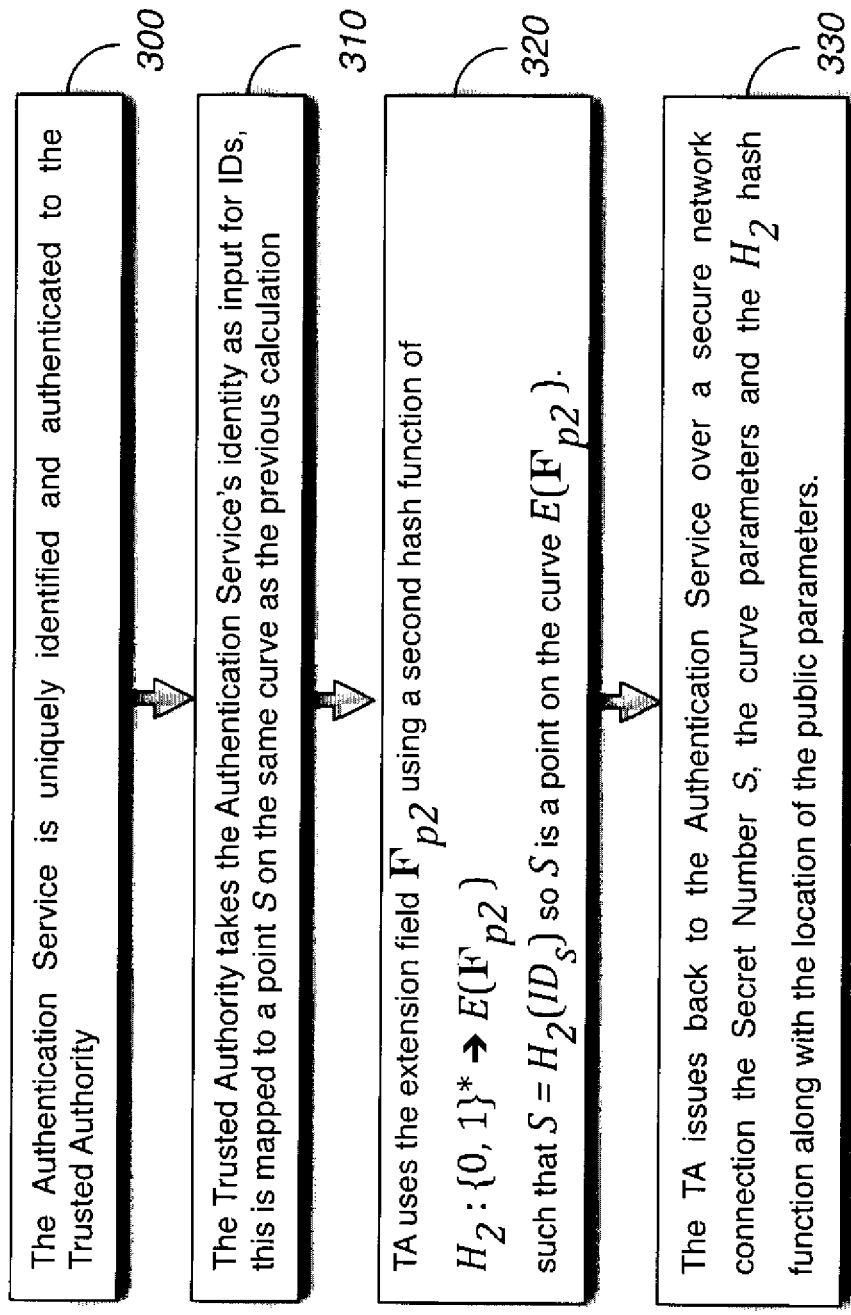
FIG. 3 is a block diagram that illustrates the steps taken that securely initializes the set-up phase of the Authentication Service Layer and its interaction with the Trusted Authority (TA) according to an embodiment of the invention.

As shown in FIG. 3, and continuing the same embodiment of the invention, the Authentication Service is uniquely identified and authenticated 300 to the Trusted Authority. The Trusted Authority takes the Authentication Service's identity 310 as input for $ID_s$, this is mapped to a point S on the same curve as the previous calculation 320, but this time over the extension field $F_{p2}$ using a second hash function of $H_2$: $\{0, 1\}* E(F_{p2})$, such that $S=H_2(ID_s)$ so S is a point on the curve $E(F_{p2})$. The TA issues back to the Authentication Service over a secure network connection the Secret Number S, the curve parameters and the $H_2$ hash function 330 along with the location of the public parameters.

As shown in FIG. 4, and continuing the same embodiment of the invention, the Client authenticates its 400 identity to the Trusted Authority. The Trusted Authority takes the Authentication Service's identity 410 $ID_a$ as input; the identity is hashed and mapped to a point A of large prime order on the curve 420. The Client receives from the Trusted Authority 430 over a secure network connection A and $_sA$, where A=c.H$(ID_a)$ is a point of order r on the base elliptic curve $E(F_p)$.

As shown in FIG. 5, and continuing the same embodiment of the invention, the Client receives from the Trusted Authority over the secured network connection A and $_sA$. In the described embodiment of the invention, a computer program, the Initialization Program (for example, in JavaScript) is served from the Trusted Authority through a web server interface to the Client, 500 which in this case is a browser, where it runs. The program takes as input the user's PIN number 510, and will calculate $\alpha A$ where $\alpha$ is the user's PIN number.

The program then subtracts the two 520 to get the number $(s-\alpha)A$. Then the program then stores 530 both $(s-\alpha)A$ and A in the Client's browser storage, and 540 prompts the user to remember their PIN. Note that as in a simple secret sharing scheme these two halves need to be reunited to reconstruct the correct value $_sA$. Additionally, the Client cannot determine the Master Secret s without solving a difficult discrete logarithm problem. Note we have a simple linear relationship of $_sA=(s-\alpha)A+\alpha A$.

Figure 6:
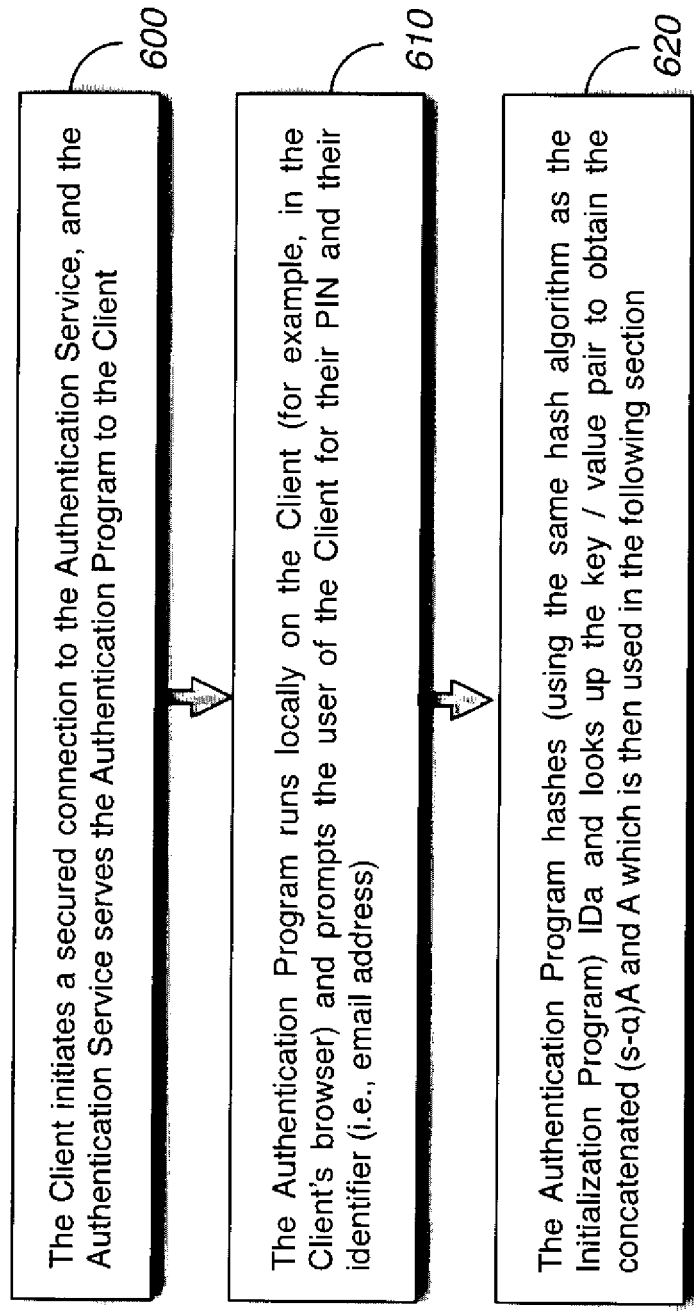
FIG. 6 is a block diagram that illustrates the steps taken between the Client and the Authentication Service Layer to receive the Authentication Program and lookup the Client's Token.

As shown in FIG. 6, and continuing the same embodiment of the invention, the Client and Authentication Service want to mutually authenticate each other over a secure network connection. Using the described embodiment, the Client initiates a secured connection to the Authentication Service, 600 and the Authentication Service serves the Authentication Program to the Client. The Authentication Program runs locally on the Client (for example, in the Client's browser) and prompts the user of the Client for their PIN and their identifier (i.e., email address) 610. The Authentication Program hashes (using the same hash algorithm as the Initialization Program) $ID_a$ and looks up the key/value 620 pair to obtain the concatenated $(s-\alpha)A$ and $A$ which is then used in the following section.

Figure 7:
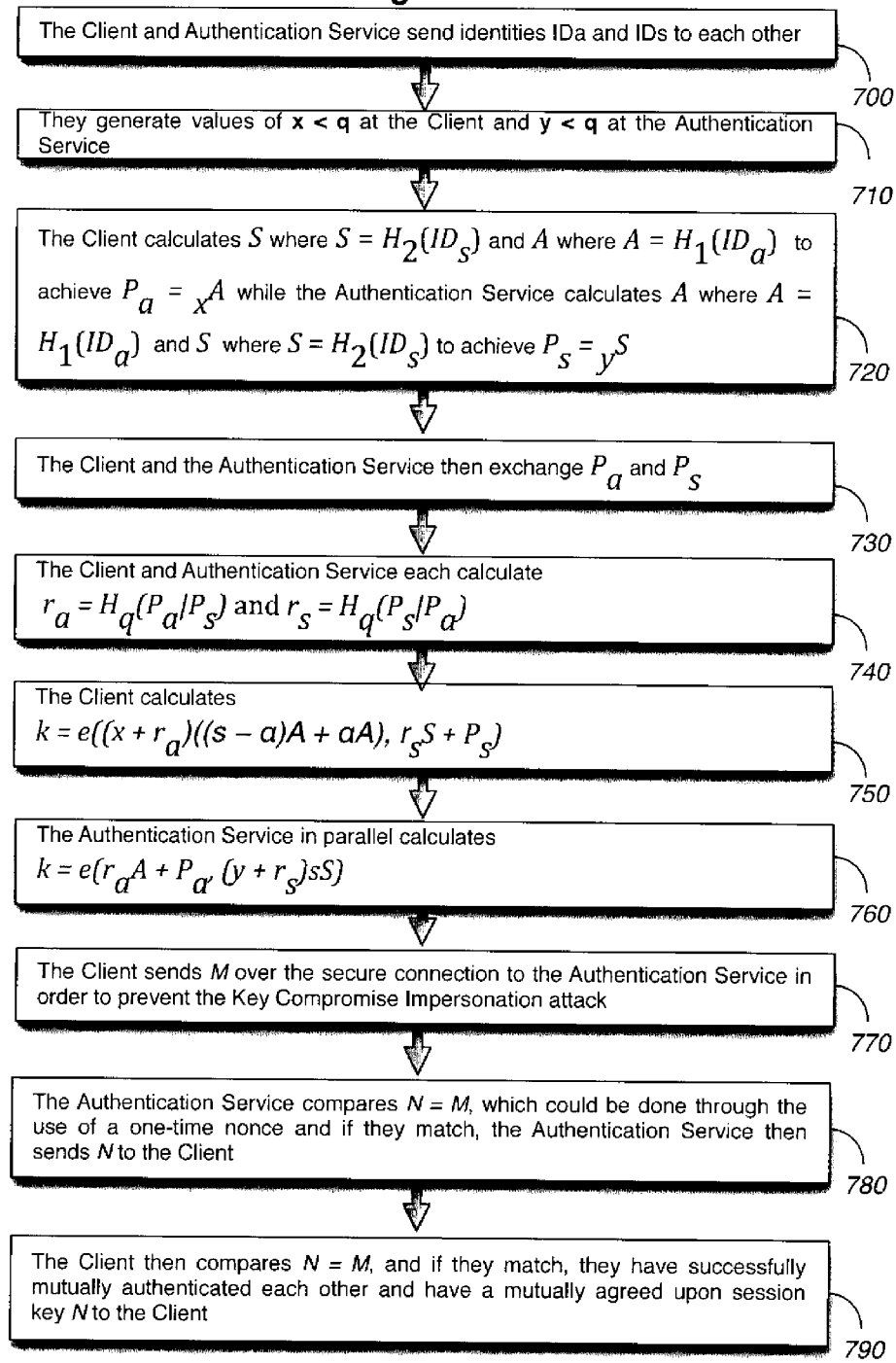
FIG. 7 is a block diagram that illustrates the steps taken between the Client and the Authentication Service Layer to construct the authenticated key agreement protocol using the Authentication Program according to an embodiment of the invention.

As shown in FIG. 7, and continuing the same embodiment of the invention, the Client and Authentication Service want to mutually authenticate each other using the system and method over a secure network connection. As we will show, our system and method is adaptable to a number of authenticated key agreement protocols over the type-3 pairing. In the preferred embodiment of the invention, the system and method is adapted to use Wang's IDAK protocol[1].

[1] Wang's IEEE 1363.3 Submission—http://grouper.ieee.org/groups/1363/IBC/submissions/idak1363.pdf In Wang's approach we assume $ID_a$ and $ID_s$ are the Client's identity and the Authentication Service's identity respectively. $H_1(.)$ is a hash function that hashes to a point of order q on the $G_1$ and $H_2(.)$ is a hash function that hashes to a point of order q on the $G_2$, and $H_q(.)$ is a hash function that hashes to a number in the range 1 to q. Assume that the Client and Authentication Service have been issued by the TA with secrets $_sA$ and $_sS$ respectively, where $A=H_1(ID_a)$, $S=H_2(ID_s)$, and s is the TA master secret. The user of the Client then divides her secret into a token value $(s-\alpha)A$ and a much smaller PIN value $\alpha A$.

For the Client and Authentication Service to mutually authenticate each other, the Client and Authentication Service establish a secure network connection and 700 send their respective identities $ID_a$ and $ID_s$ to each other. They generate values of x<q at the Client and y<q at the Authentication Service 710. Next, 720 the Client calculates S where $S=H_2(ID_s)$ and A where $A=H_1(ID_a)$ to achieve $P_a=xA$ while the Authentication Service calculates A where $A=H_1(ID_a)$ and S where $S=H_2(ID_s)$ to achieve $P_s=yS$. The Client and the Authentication Service 730 then exchange $P_a$ and $P_s$ over the secure network connection with each other. Next, the Client and Authentication Service each 740 calculate $r_a=H_q(P_a|P_s)$ and $r_s=H_q(P_s|P_a)$. The Client then 750 calculates $k=e((x+r_a)((s-\alpha)A+\alpha A), r_sS+P_s)$ so that it may achieve K where $K=H(k)$ for M where $M=H(ID_a, ID_s, K)$. The Authentication Service in parallel calculates 760 $k=e(r_aA+P_a, (y+r_s)sS)$ so that it may achieve K where $K=H(k)$ and $N=H(ID_a, ID_s, K)$. In this particular preferred embodiment of the invention, the next steps are crucial to get right; the Client sends M over the secure connection 770 to the Authentication Service and this must happen first, before the Authentication Service can send anything to the Client, in order to prevent the Key Compromise Impersonation attack. The Authentication Service compares N=M, which could be done through the use of a one-time nonce, and if they match 780, the Authentication Service then sends N to the Client. The Client then compares N=M, 790 and if they match, they have successfully mutually authenticated each other and have a mutually agreed upon session key.

Note that for both parties observe that $k=e(A,S)^{s(x+ra)(y+rs)}$. Observe (and take comfort from) the fact that the Token and PIN are recombined locally before any value calculated from them is transmitted, so no-one is in the position to determine the PIN from transmitted values, irrespective of their computing power. If the wrong PIN is entered, the Authentication Service drops the connection.

However we would emphasis that this protocol needs a very careful implementation to avoid problems. Any elaboration (like encrypting the token secret with the PIN) or omission (like the Server not confirming the key before proceeding) could lead to a compromise of the system.

The invention claimed is:

1. A method comprising:
    finding, at a trusted authority, a non-supersingular curve with an even k for which no distortion map exists, the curve having a base field $F_p$ and an extension field $F_{p2}$ and a curve order c.q;
    generating a master secret s;
    choosing hash function $H_1: \{0,1\}^* \rightarrow E(F_p)$;
    publishing public parameters;
    identifying and authenticating an authentication service to the trusted authority;
    taking, at the trusted authority, an identity IDs of the authentication service as input and mapping the identity IDs to a point, S, on the curve;
    using, over the extension field $F_{p2}$, a second hash function of $H_2: \{0,1\}^* \rightarrow E(F_{p2})$ such that $S=H_2(ID_s)$ so s, a secret number, is a point on the curve $E(F_{p2})$;
    issuing back to the authentication service over a secure network connection the secret number s, parameters of the curve and the $H_2$ hash function along with a location of the public parameters;
    authenticating, at a client, an identity to the trusted authority;
    taking, at the trusted authority, a client's identity $ID_a$ as input;
    hashing, at the trusted authority, the identity $ID_a$ and mapping to a point A of large prime order on the curve;
    receiving, at the client, from the trusted authority over the secure network connection A and s, where $A=c.H_1(ID_a)$ is a point of order q over the base field of the curve $E(F_p)$;
    taking, at the client, as input a PIN number, $\alpha$, and calculating $\alpha A$;
    producing, at the client, a number $(s-\alpha)A$;
    storing, at the client, both $(s-\alpha)A$ and A in a browser storage of the client;
    using an authentication program at the client to prompt a user of the client for their PIN and their identifier;
    using, at the client, the authentication program to hash $ID_a$;
    using, at the client, the hash function $H_1$, and to look up a key/value pair to obtain $(s-\alpha)A$ and A;
    sending identities $ID_a$ and $ID_s$, between the client and authentication service;
    generating values of x<q at the client and y<q at the authentication service;
    calculating, at the client, S where $S=H_2(ID_s)$ and A where $A=H_1(ID_a)$ to achieve $P_a=xA$ while, at the authentication service, calculating A where $A=H_1(ID_a)$ and S where $S=H2(IDs)$ to achieve $Ps=yS$;
    exchanging $P_a$ and $P_s$ between the client and authentication service;
    calculating $r_a=H_q(P_a|P_s)$ and $r_s=H_q(P_s|P_a)$ at the client and the authentication service;
    calculating, at the client, $k=e((x+r_a)((s-\alpha)A+\alpha A), r_sS+P_s)$ to obtain $K=H_3(k)$ and $M=H_3(ID_a, ID_s, K)$;
    at the authentication service, calculating $k=e(r_aA+P_a(y+r_s)sS)$ to obtain $K=H_3(k)$ and $N=H_3(ID_a, ID_s, K)$;
    sending, at the client, M over the secure connection to the authentication service;

sending N to the client in response to a comparison, N=M, at the authentication service indicating a match; and determining, at the client, that the client and authentication service have successfully mutually authenticated each other and have a mutually agreed upon session key N in response to a comparison of N to M at the client indicating a match.

* * * * *